(12) United States Patent
Hayashida et al.

(10) Patent No.: US 8,273,316 B2
(45) Date of Patent: Sep. 25, 2012

(54) METHOD FOR PURIFICATION OF SILICON TETRACHLORIDE

(75) Inventors: Satoshi Hayashida, Kumamoto (JP); Harumichi Semoto, Kumamoto (JP)

(73) Assignees: JNC Corporation, Tokyo (JP); JX Nippon Mining & Metals Corporation, Tokyo (JP); Toho Titanium Co., Ltd., Kanagawa (JP)

( * ) Notice: Subject to any disclaimer, the term of this patent is extended or adjusted under 35 U.S.C. 154(b) by 60 days.

(21) Appl. No.: 13/059,961

(22) PCT Filed: Aug. 19, 2009

(86) PCT No.: PCT/JP2009/064507
§ 371 (c)(1),
(2), (4) Date: Jan. 18, 2011

(87) PCT Pub. No.: WO2010/021339
PCT Pub. Date: Feb. 25, 2010

(65) Prior Publication Data
US 2011/0142742 A1    Jun. 16, 2011

(30) Foreign Application Priority Data

Aug. 22, 2008   (JP) .................................. 2008-214056

(51) Int. Cl.
*C01B 33/107*    (2006.01)
(52) U.S. Cl. ...................... 423/341; 423/342; 423/245.1; 423/245.3

(58) Field of Classification Search .................. 423/341, 423/342
See application file for complete search history.

(56) References Cited

U.S. PATENT DOCUMENTS

| | | | |
|---|---|---|---|
| 4,094,815 A * | 6/1978 | Cedro et al. ..................... | 502/35 |
| 5,232,602 A * | 8/1993 | Brink et al. ..................... | 210/681 |
| 2009/0060819 A1* | 3/2009 | Bill et al. ........................ | 423/342 |
| 2011/0158885 A1* | 6/2011 | Hayashida et al. ............. | 423/342 |

FOREIGN PATENT DOCUMENTS

| | | |
|---|---|---|
| JP | 59-030712 | 2/1984 |
| JP | 07-002510 | 1/1995 |
| JP | 2004-149351 | 5/2004 |

OTHER PUBLICATIONS

International Search Report of International PCT Application No. PCT/JP2009/064507, dated Nov. 24, 2009.

* cited by examiner

*Primary Examiner* — Ngoc-Yen Nguyen
(74) *Attorney, Agent, or Firm* — J.C. Patents

(57) ABSTRACT

An object of the present invention is to provide a method for purification of silicon tetrachloride which solves the problems of separating and removing organic chlorosilanes by distillation or adsorption.

The method for purification of silicon tetrachloride comprises the steps of (1) bringing a mixed gas including a silicon tetrachloride gas and an oxygen-containing gas into contact with a catalyst layer which is controlled to a temperature of 200 to 450° C. and which includes at least one selected from the group consisting of activated carbon and metal-supporting activated carbon, and (2) cooling the mixed gas after brought into contact to separate and recover liquid silicon tetrachloride.

5 Claims, 1 Drawing Sheet

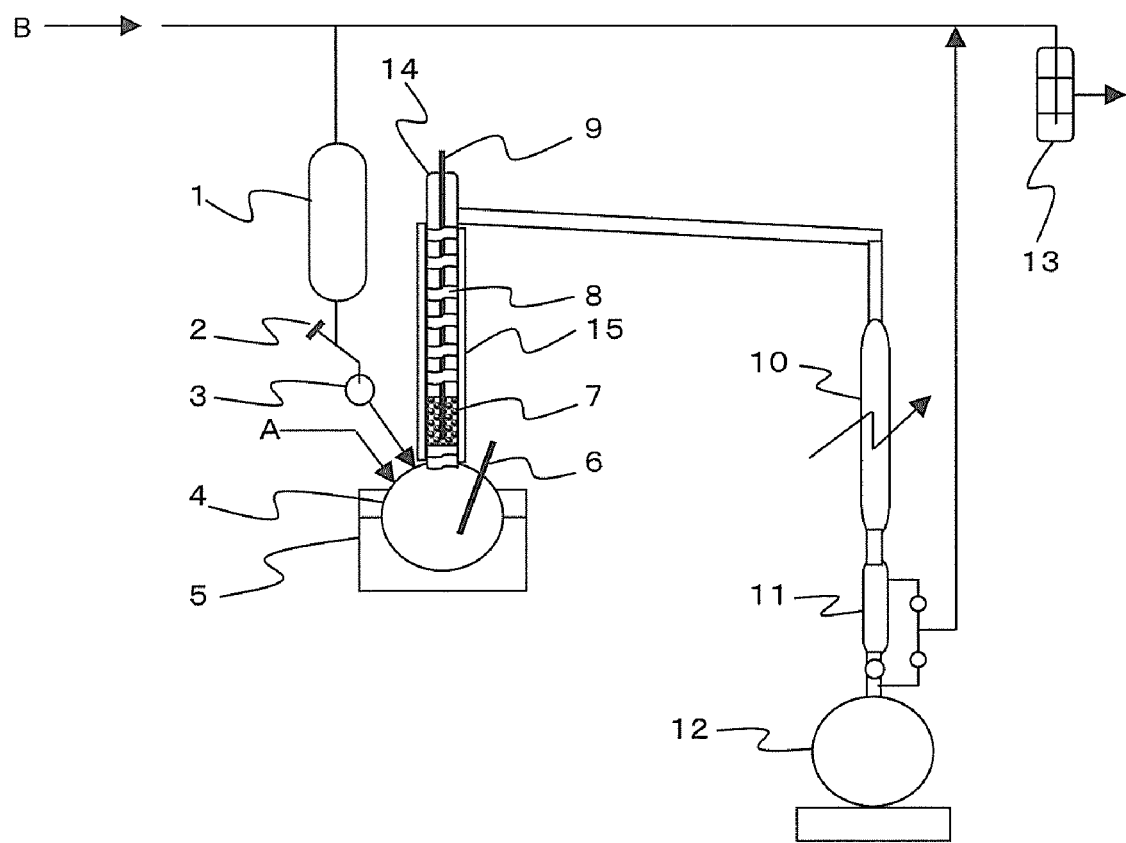

METHOD FOR PURIFICATION OF SILICON TETRACHLORIDE

TECHNICAL FIELD

The present invention relates to a method for purification of silicon tetrachloride. Specifically, it relates to a purification method for removing a trace amount of carbon-containing silicon-chlorine compounds (organic chlorosines) contained as impurities in silicon tetrachloride.

BACKGROUND ART

Polycrystalline silicon is used as a raw material of monocrystalline silicon for semiconductors and a raw material of monocrystalline silicon for solar cells. High electric characteristics are required to the monocrystalline silicon, and therefore an amount of carbon which is an impurity exerting an adverse effect on the electric characteristics is desired to be reduced as much as possible.

Production processes for polycrystalline silicon include a process in which it is produced by reduction of silicon tetrachloride ($SiCl_4$) using a metal reducing agent. To cut down an amount of carbon contained in polycrystalline silicon produced in the production process, it is important to reduce a trace amount of carbon-containing silicon-chlorine compounds (hereinafter referred to as organic chlorosilanes) contained as impurities in silicon tetrachloride. Accordingly, a purification method comprising separating and removing organic chlorosilanes from silicon tetrachloride by distillation has so far been carried out. However, even though the method is generally very expensive, such as requiring installation of a lot of multistage distillation towers, it is difficult to sufficiently separate and remove organic chlorosilanes.

In order to solve the problem, a method in which the number of distillation towers is decreased and comprising bringing silicon tetrachloride into contact with an adsorbent to separate and remove organic chlorosilanes is proposed (refer to, for example, a patent literature 1). The adsorbents include silica gel, activated carbon and molecular sieves and the like each having a large specific surface area. However, the adsorbents have the problem that an adsorbing ability of organic chlorosilanes is reduced while using and that the waste is generated due to exchanging the adsorbents.

CITATION LIST

Patent Literature

Patent literature 1: JPA 2004-149351

SUMMARY OF INVENTION

Technical Problem

The present invention has been made in light of the situation described above, and an object of the present invention is to provide a method for purification of silicon tetrachloride which solves the problems of separating and removing organic chlorosilanes by distillation or adsorption.

Solution to Problem

The present inventors have made intense researches in order to solve the problems and come to complete the present invention.

The present invention is constituted by the following invention.

[1] A method for purification of silicon tetrachloride comprising the steps of (1) bringing a mixed gas comprising a silicon tetrachloride gas and an oxygen-containing gas into contact with a catalyst layer which is controlled to a temperature of 200 to 450° C. and which comprises at least one selected from the group consisting of activated carbon and metal-supporting activated carbon, and (2) cooling the mixed gas after brought into contact to separate and recover liquid silicon tetrachloride.

[2] The method for purification of silicon tetrachloride as described in the item [1], further comprising a step of (3) distilling the liquid silicon tetrachloride.

[3] The method for purification of silicon tetrachloride as described in the item [1] or [2], wherein the metal is at least one selected from the group consisting of platinum, palladium and rhodium.

[4] The method for purification of silicon tetrachloride as described in any of the items [1] to [3], wherein the molar ratio (oxygen/silicon tetrachloride gas) of the silicon tetrachloride gas and oxygen in the mixed gas is in the range of 0.0004 to 0.2.

[5] The method for purification of silicon tetrachloride as described in any of the items [1] to [4], wherein the oxygen-containing gas is air or pure oxygen (oxygen concentration: 100%).

Advantageous Effects of Invention

The method for purification of silicon tetrachloride according to the present invention makes use of a catalytic reaction in which at least one selected from the group consisting of activated carbon and metal-supporting activated carbon acts as an adsorbent and acts as a catalyst for oxidizing and decomposing organic chlorosilanes contained as an impurities in silicon tetrachloride, and therefore an effect of the filler is extended notably as compared with a case making use of only adsorption.

BRIEF DESCRIPTION OF DRAWINGS

FIG. 1 is a schematic drawing of an apparatus for refining silicon tetrachloride.

DESCRIPTION OF EMBODIMENTS

The best mode for carrying out the present invention shall be explained.

The method for purification of silicon tetrachloride according to the present invention comprises (1) contact step of bringing a mixed gas comprising a silicon tetrachloride gas and an oxygen-containing gas into contact with a catalyst layer which is controlled to a temperature of 200 to 450° C. and which comprises at least one selected from the group consisting of activated carbon and metal-supporting activated carbon, and (2) recovering step of cooling the mixed gas after brought into contact to separate and recover liquid silicon tetrachloride. The method for purification of silicon tetrachloride according to the present invention may further comprise (3) distilling step of distilling the liquid silicon tetrachloride.

According to the purification method of the present invention, purified silicon tetrachloride having a high purity can be obtained from silicon tetrachloride containing impurities such as organic chlorosilanes.

(1) Contact Step:

In the present step, the mixed gas comprising a silicon tetrachloride gas and an oxygen-containing gas are brought into contact with the catalyst layer which is controlled to a temperature of 200 to 450° C. and which comprises at least one selected from the group consisting of activated carbon and metal-supporting activated carbon, whereby organic chlorosilanes contained as an impurity in a silicon tetrachloride gas are oxidized and decomposed.

The organic chlorosilanes include $CH_3SiCl_3$, $(CH_3)_2SiCl_2$, $(CH_3)_3SiCl$, $(CH_3)_2HSiCl$ and the like. These compounds are presumed to be oxidized and decomposed, as shown in the following equations (1) to (4), by the contact treatment.

$$CH_3SiCl_3 + 2O_2 \rightarrow CO_2 + SiO_2 + 3HCl \qquad (1)$$

$$(CH_3)_2SiCl_2 + SiCl_4 + 4O_2 \rightarrow 2CO_2 + 2SiO_2 + 6HCl \qquad (2)$$

$$(CH_3)_3SiCl + 2SiCl_4 + 6O_2 \rightarrow 3CO_2 + 3SiO_2 + 9HCl \qquad (3)$$

$$2(CH_3)_2HSiCl + 3SiCl_4 + 9O_2 \rightarrow 4CO_2 + 5SiO_2 + 14HCl \qquad (4)$$

<Catalyst Layer>

In the present invention, at least one selected from the group consisting of activated carbon and metal-supporting activated carbon is used as a catalyst for oxidizing and decomposing organic chlorosilanes contained as an impurities in a silicon tetrachloride gas. Only the activated carbon may be used as the catalyst, and the metal-supporting activated carbon in order to accelerate the oxidation and decomposition can be used alone or in combination with the activated carbon which supports no metal.

The activated carbons include Spherical Shirasagi X7100H (manufactured by Japan EnviroChemicals, Ltd.), Granular Shirasagi KL (manufactured by Japan EnviroChemicals, Ltd.), Granular Shirasagi G2X (manufactured by Japan EnviroChemicals, Ltd.), Fuji Activated Carbon ACG-M (manufactured by Japan Serachem Co., Ltd.) and the like. Among them, Spherical Shirasagi X7100H (manufactured by Japan EnviroChemicals, Ltd.) and Granular Shirasagi G2X (manufactured by Japan EnviroChemicals, Ltd.) are preferably used.

The metals include platinum, palladium, rhodium, ruthenium, rhenium, iridium, gold, silver, nickel, copper, cobalt, zinc, iron, tungsten and the like. Among them, platinum, palladium and rhodium are preferred. They may be used alone or in combination of two or more kinds thereof.

When the metal-supporting activated carbon is used as the catalyst, an amount of the metal supported on the activated carbon is preferably 0.1 to 2% by weight, more preferably 0.5 to 1.5% by weight based on 100% by weight of the whole weight of the catalyst forming the catalyst layer. If an amount of the metal supported on the activated carbon is in the range, organic chlorosilanes contained as impurities in silicon tetrachloride are efficiently oxidized and decomposed.

Forms of the activated carbon and the metal-supporting activated carbon, which constitute the catalyst, shall not specifically be restricted and include a spherical particulate, granular, pellet-formed, honeycomb-formed and the like.

The catalyst layer is controlled to a temperature of 200 to 450° C., preferably 250 to 400° C. If a temperature of the catalyst layer is in the range, the temperature is not too low to reduce a reaction rate in oxidative decomposition of organic chlorosilanes, and the organic chlorosilanes contained as impurities in a silicon tetrachloride gas are efficiently oxidized and decomposed into carbon dioxide, silicon dioxide and a hydrogen chloride gas (refer to the equations (1) to (4)). Further, the temperature is not likely to be too high to allow the catalyst forming the catalyst layer to be ignited, and carbon tetrachloride which is estimated to be produced by side reaction shown in the following equation (5) is inhibited from being produced:

$$C + 4HCl + O_2 \rightarrow CCl_4 + 2H_2O \qquad (5)$$

The catalyst layer can be formed, for example, by charging a column with the activated carbon and the metal-supporting activated carbon. Further, it may be formed by charging a fluidized bed type reaction apparatus with them. Also, moisture and the like may be contained in the catalyst layer as long as the object of the present invention is not disturbed.

In the activated carbon and the metal-supporting activated carbon which form the catalyst layer, adsorbed moisture is preferably removed by heating before subjected to the oxidative decomposition reaction, for example, before forming the catalyst layer in order to inhibit silicon dioxide from being produced by reacting moisture contained therein with silicon tetrachloride (refer to the following equation (6)):

$$SiCl_4 + 2H_2O \rightarrow SiO_2 + 4HCl \qquad (6)$$

<Mixed Gas>

In the present invention, the mixed gas comprising a silicon tetrachloride gas and an oxygen-containing gas are brought into contact with the catalyst layer, whereby a trace amount of organic chlorosilanes contained in the silicon tetrachloride gas is oxidized and decomposed as shown in the equations (1) to (4).

The oxygen-containing gases include gases containing $O_2$ and/or $O_3$ such as air, pure oxygen (oxygen concentration: 100%), a gas containing ozone. Among them, air and pure oxygen are preferred, and air is preferred from the viewpoint of an availability and a cost. The oxygen-containing gas is preferably filtrated in advance to remove foreign matters, and it is preferably dehumidified to control a moisture content thereof to 1200 wppm or less, preferably 300 to 1000 wppm.

A mixing ratio of the silicon tetrachloride gas and the oxygen-containing gas in the mixed gas is preferably controlled so that a molar ratio (oxygen/silicon tetrachloride gas) is 0.0004 to 0.2, and more preferably controlled so that the molar ratio is 0.0015 to 0.17. For example, when air is used as the oxygen-containing gas, the molar ratio (air/silicon tetrachloride gas) is 0.0020 to 1.0.

If a proportion of oxygen in the mixed gas is in the range, oxidative decomposition of organic chlorosilane proceeds efficiently. Further, carbon tetrachloride which is liable to be produced by oxychlorination reaction shown in the equation (5) when a proportion of oxygen in the mixed gas is too high is inhibited as well from being produced. Also, if air is used, silicon tetrachloride is accompanied with the mixed gas after the contact treatment and lost in a certain case, and such loss of silicon tetrachloride is inhibited as well. In the present invention, a proportion of oxygen in the mixed gas at an initial stage of the contact treatment is preferably high in order to provide activated carbon newly filled as the catalyst layer with a catalytic activity.

A contact treating time of the catalyst layer with the mixed gas is in the range of preferably 3 to 30 seconds, more preferably 5 to 20 seconds. If the contact treating time is in the range, organic chlorosilanes contained in silicon tetrachloride are efficiently oxidized and decomposed. The contact treating time is a value obtained by dividing a volume ($cm^3$) of the catalyst layer by a passing amount ($cm^3$/second) of the mixed gas. In this connection, a passing amount of the mixed gas in the contact treating time is a value in the catalyst layer heated to the temperature range described above.

(2) Recovering Step:

In the present step, the mixed gas after the contact treatment which is obtained in the contact step (1) is cooled to a boiling point (57° C. (1 atm)) of silicon tetrachloride or lower, preferably −10 to 30° C. and more preferably −5 to 20° C. to separate and recover silicon tetrachloride from the mixed gas in the form of a liquid.

The mixed gas containing carbon dioxide, hydrogen chloride and the like after separating and recovering silicon tetrachloride is washed with water in a waste gas scrubber and then discharged to the air.

(3) Distilling Step:

In the present step, the liquid silicon tetrachloride obtained in the recovering step (2) is distilled to obtain purified silicon tetrachloride containing fewer impurities. The distillation can be carried out by publicly known methods and conditions. To be specific, the liquid silicon tetrachloride obtained in the recovering step (2) is allowed to pass through a distillation tower and heated by an evaporator, whereby silicon tetrachloride can be taken out from a tower head, and carbon tetrachloride and other impurities can be taken out from a tower bottom in a concentrated state.

Purified Silicon Tetrachloride:

In the silicon tetrachloride obtained through the recovering step (2) or the distilling step (3) each described above, a trace amount of organic chlorosilanes contained as impurities in the silicon tetrachloride are reduced to a large extent, and therefore it can be used for polycrystalline silicon having a small carbon content which can be used as a raw material of monocrystalline silicon for semiconductors.

EXAMPLES

The purification method for silicon tetrachloride according to the present invention shall be explained below by examples and comparative examples while referring to FIG. 1, but the present invention shall not be restricted to these examples.

Example 1

Catalyst Activation Treatment

Activated carbon (trade name: Spherical Shirasagi X7100H (dry), manufactured by Japan EnviroChemicals, Ltd.) was heated at 300° C. to remove moisture for 2 hours and then cooled down to room temperature. A packed tower 14 having an inner diameter of 30 mm and a length of 200 mm equipped with flat perforated plates was charged with 53 g of the activated carbon from which moisture was removed to form a catalyst layer 7.

Next, a four neck flask 4 equipped with a cooling tube 10, a thermometer 9, a silicon tetrachloride-dropping device 1 of 500 ml and the packed tower 14 equipped with flat perforated plates was heated at 120° C. on an oil bath 5, and the packed tower 14 was heated at 350° C. by a ribbon heater 8. A heat insulating material 15 was wound on the ribbon heater 8 to prevent heat from being released from the filling tower 14.

Then, silicon tetrachloride (hereinafter referred to as "silicon tetrachloride before refining treatment") containing impurities (organic chlorosilane compounds) having concentrations shown in Table 1 was added to the four neck flask 4 from the silicon tetrachloride-dropping device 1 at a rate of 2 ml/minute under room temperature (23° C.) while introducing nitrogen B in order to prevent moisture from being mixed in. Further, air A (hereinafter referred to as "dehumidified air A") which was dehumidified up to a dew point of −18° C. (moisture amount: 1000 wppm) through a molecular sieve-packed layer and a silica gel-packed layer was supplied to the four neck flask 4 at a rate of 1.9 L/hour (23° C.) while dropping the silicon tetrachloride before refining treatment. The dew point was measured by means of Isuzu dew point measuring device ISUZU-1A (manufactured by Isuzu Seisakusho Co., Ltd.). A mixing molar ratio (molar ratio of silicon tetrachloride and oxygen) of the silicon tetrachloride and the dehumidified air A in the mixed gas thus obtained is shown in Table 1.

The mixed gas of the silicon tetrachloride gas and the dehumidified air A passed through a catalyst layer 7 in the packed tower 14 and was subjected to contact treatment with the activated carbon and then cooled down to 10° C. by the cooling tube 10 at an outlet of the packed tower 14, and liquid silicon tetrachloride was separated from the mixed gas and recovered in a 500 mL eggplant flask 12.

The liquid silicon tetrachloride was analyzed by means of a gas chromatographic mass spectrometer (GC-MS) to confirm that it was silicon tetrachloride in which the contents of respective organic chlorosilanes (methyldichlorosilane, trimethylchlorosilane, methyltrichlorosilane and dimethyldichlorosilane) as impurities were less than 0.01 wppm (less than the detection lower limit). The results thereof are shown in Table 1. Further, the conditions of the analysis carried out by means of the gas chromatographic mass spectrometer (GC-MS) are shown in Table 2.

Example 2

The catalyst activation treatment in Example 1 was carried out, and then the contact treatment was carried out on the same conditions as in Example 1, except that the packed tower 14 was heated at 350° C. by the ribbon heater 8; 300 ml of the silicon tetrachloride before refining treatment was dropwise added from the silicon tetrachloride-dropping device 1 at a rate of 2 ml/minute under room temperature; and the dehumidified air A was supplied to the four neck flask 4 at a rate of 0.4 L/hour (23° C.)

Further, the silicon tetrachloride after the contact treatment was distilled at a distillation temperature of 5° C. by means of a distillation apparatus having a theoretical stage number of 10 stages which was not illustrated in order to separate by-produced carbon tetrachloride.

The silicon tetrachloride obtained by the distillation was analyzed by means of the gas chromatographic mass spectrometer (GC-MS) to find that a content of the carbon tetrachloride which was 11 wppm before the distillation was less than 0.01 wppm (less than the detection lower limit). Further, it was confirmed that the silicon tetrachloride had the contents of less than 0.01 wppm (less than detection lower limit) of the respective organic chlorosilanes which were impurities. The results thereof are shown in Table 1.

Example 3

The contact treatment in Example 2 was carried out, and then the contact treatment was further carried out on the same conditions as in Example 2 by using 300 ml of the silicon tetrachloride before refining treatment. The silicon tetrachloride (not distilled) obtained after the contact treatment was analyzed by means of the gas chromatographic mass spectrometer (GC-MS) to find that the contents of the respective organic chlorosilanes which were impurities were less than 0.01 wppm (less than the detection lower limit). The results thereof after the contact treatment are shown in Table 1.

Example 4

The catalyst activation treatment was carried out on the same conditions as in Example 1, and then the contact treatment was carried out on the same conditions as in Example 2, except that the packed tower 14 was heated at 400° C. by the ribbon heater 8 to carry out the contact treatment. The silicon tetrachloride (not distilled) obtained after the contact treatment was analyzed by means of the gas chromatographic mass spectrometer (GC-MS) to find that the contents of the respective organic chlorosilanes which were impurities were less than 0.01 wppm (less than the detection lower limit). The results thereof after the contact treatment are shown in Table 1.

Example 5

The catalyst activation treatment was carried out on the same conditions as in Example 1, and then the contact treatment was carried out on the same conditions as in Example 2, except that the packed tower 14 was heated at 300° C. by the ribbon heater 8 to carry out the contact treatment. The silicon tetrachloride (not distilled) obtained after the contact treatment was analyzed by means of the gas chromatographic mass spectrometer (GC-MS) to find that the contents of the respective organic chlorosilanes which were impurities were less than 0.01 wppm (less than the detection lower limit). The results thereof after the contact treatment are shown in Table 1.

Example 6

The catalyst activation treatment was carried out on the same conditions as in Example 1, and then the contact treatment was carried out on the same conditions as in Example 2, except that the packed tower 14 was heated at 250° C. by the ribbon heater 8 to carry out the contact treatment. The silicon tetrachloride (not distilled) obtained after the contact treatment was analyzed by means of the gas chromatographic mass spectrometer (GC-MS) to find that the contents of the respective organic chlorosilanes which were impurities were less than 0.01 wppm (less than the detection lower limit). The results thereof after the contact treatment are shown in Table 1.

Example 7

The catalyst activation treatment was carried out on the same conditions as in Example 1, and then the contact treatment was carried out on the same conditions as in Example 2, except that the packed tower 14 was heated at 200° C. by the ribbon heater 8 to carry out the contact treatment. The silicon tetrachloride (not distilled) obtained after the contact treatment was analyzed by means of the gas chromatographic mass spectrometer (GC-MS) to find that the contents of the respective organic chlorosilanes which were impurities were less than 0.01 wppm (less than the detection lower limit). The results thereof after the contact treatment are shown in Table 1.

Example 8

The catalyst activation treatment was carried out on the same conditions as in Example 1, except that the packed tower 14 was charged in place of the activated carbon with 44 g of activated carbon (trade name: 0.5% Pt Carbon Pellet, manufactured by N.E. CHEMCAT CORPORATION) which supported 0.5% by weight of platinum, and then the contact treatment was carried out on the same conditions as in Example 2. The silicon tetrachloride (not distilled) obtained after the contact treatment was analyzed by means of the gas chromatographic mass spectrometer (GC-MS) to find that the contents of the respective organic chlorosilanes which were impurities were less than 0.01 wppm (less than the detection lower limit). The results thereof after the contact treatment are shown in Table 1.

Comparative Example 1

The contact treatment was carried out on the same conditions as in Example 2, except that the packed tower 14 was charged with 92 g of glass Raschig rings (size: inner diameter of 2.5 mm, and outer diameter of 5.0 mm and 5.0 mm, made of quartz) in place of the activated carbon. The silicon tetrachloride (not distilled) obtained after the contact treatment was analyzed by means of the gas chromatographic mass spectrometer (GC-MS) to find that the contents of the respective organic chlorosilanes which were impurities were not confirmed to be reduced. The results thereof are shown in Table 1.

Comparative Example 2

The catalyst activation treatment was carried out on the same conditions as in Example 1, and then the contact treatment was carried out on the same conditions as in Example 2, except that the packed tower 14 was heated at 150° C. by the ribbon heater 8 to carry out the contact treatment. The silicon tetrachloride (not distilled) obtained after the contact treatment was analyzed by means of the gas chromatographic mass spectrometer (GC-MS) to find that the contents of the respective organic chlorosilanes which were impurities were not confirmed to be reduced. The results thereof are shown in Table 1.

Comparative Example 3

The catalyst activation treatment was carried out on the same conditions as in Example 1, and then the contact treatment was carried out on the same conditions as in Example 2, except that the dehumidified air A was not supplied. The silicon tetrachloride (not distilled) obtained after the contact treatment was analyzed by means of the gas chromatographic mass spectrometer (GC-MS) to find that the contents of the respective organic chlorosilanes which were impurities were not confirmed to be reduced. The results thereof are shown in Table 1.

Comparative Example 4

The packed tower 14 having a inner diameter of 20 mm and a length of 200 mm was charged with 53 g of the activated carbon (trade name: Spherical Shirasagi X7100H (dry), manufactured by Japan EnviroChemicals, Ltd.). 300 ml of silicon tetrachloride before refining treatment at 27° C. was dropwise added from a tower head part of the packed tower 14 at a rate of 5 ml/minute, and the silicon tetrachloride subjected to adsorption treatment was recovered from a tower bottom part of the packed tower 14. The recovered silicon tetrachloride was analyzed by means of the gas chromatographic mass spectrometer (GC-MS). As a result of the analysis, the contents of the respective organic chlorosilanes which were impurities were not confirmed to be reduced. The results thereof are shown in Table 1.

The contents of the respective organic chlorosilanes contained in the silicon tetrachloride before refining treatment and the silicon tetrachloride subjected to the refining treatment in the examples and the comparative examples are shown in Table 1.

TABLE 1

| | Analysis | Before refining treatment | Example 1 After endowed with activity | Example 2 After contact treatment and after distillation | Example 3 After contact treatment | Example 4 After contact treatment | Example 5 After contact treatment | Example 6 After contact treatment | Example 7 After contact treatment | Example 8 After contact treatment |
|---|---|---|---|---|---|---|---|---|---|---|
| Names of impurities | Methyldichlorosilane (wppm) | <0.01 | <0.01 | <0.01 | <0.01 | <0.01 | <0.01 | <0.01 | <0.01 | <0.01 |
| | Trimethylchlorosilane (wppm) | 0.02 | <0.01 | <0.01 | <0.01 | <0.01 | <0.01 | <0.01 | <0.01 | <0.01 |
| | Methyltrichlorosilane (wppm) | 5.30 | <0.01 | <0.01 | <0.01 | <0.01 | <0.01 | <0.01 | <0.01 | <0.01 |
| | Dimethyldichlorosilane (wppm) | 0.08 | <0.01 | <0.01 | <0.01 | <0.01 | <0.01 | <0.01 | <0.01 | <0.01 |
| Catalyst | | — | Spherical Shirasagi X7100H (dry) | Spherical Shirasagi X7100H (dry) | Spherical Shirasagi X7100H (dry) | Spherical Shirasagi X7100H (dry) | Spherical Shirasagi X7100H (dry) | Spherical Shirasagi X7100H (dry) | Spherical Shirasagi X7100H (dry) | 0.5% Pt Carbon Pellet |
| Heating temperature (° C.) of catalyst layer | | — | 350 | 350 | 350 | 400 | 300 | 250 | 200 | 350 |
| Mixing molar ratio (oxygen/silicon tetrachloride gas) | | — | 0.01667 | 0.00339 | 0.00339 | 0.00339 | 0.00339 | 0.00339 | 0.00339 | 0.00339 |
| Contact time (s) of catalyst layer with mixed gas | | — | 6.0 | 6.4 | 6.4 | 5.9 | 6.9 | 7.6 | 8.4 | 6.4 |

| | Analysis | Before refining treatment | Comparative Example 1 After contact treatment | Comparative Example 2 After contact treatment | Comparative Example 3 After contact treatment | Comparative Example 4 After contact treatment |
|---|---|---|---|---|---|---|
| Names of impurities | Methyldichlorosilane (wppm) | <0.01 | <0.01 | <0.01 | <0.01 | <0.01 |
| | Trimethylchlorosilane (wppm) | 0.02 | 0.02 | 0.02 | 0.03 | 0.02 |
| | Methyltrichlorosilane (wppm) | 5.30 | 5.25 | 5.28 | 5.14 | 5.15 |
| | Dimethyldichlorosilane (wppm) | 0.08 | 0.09 | 0.07 | 0.08 | 0.07 |
| Catalyst | | — | Glass Raschig ring | Spherical Shirasagi X7100H (dry) | Spherical Shirasagi X7100H (dry) | Spherical Shirasagi X7100H (dry) |
| Heating temperature (° C.) of catalyst layer | | — | 350 | 150 | 350 | — |
| Mixing molar ratio (oxygen/silicon tetrachloride gas) | | — | 0.00339 | 0.00339 | 0 | — |
| Contact time (s) of catalyst layer with mixed gas | | — | 6.4 | 9.4 | 6.5 | 10.0 |

TABLE 2

| Items | Conditions |
|---|---|
| GC-MS apparatus | GCMS-QP2010 Plus (manufactured by Shimadzu Corporation) |
| Column product name | InertCap 5 (manufactured by GL Sciences Inc.) |
| Column size | Inner diameter: 0.32 mm, length: 60 m |
| Column liquid phase | 5% Diphenyl-95% Dimethylpolysiloxane |
| Column liquid phase film thickness | 1.00 μm |
| Carrier gas | Ultrahigh purity helium |
| Column temperature | 60° C. |
| Column flow rate | 2 ml/minute |
| Sample injection volume | 0.6 μl |
| Sample injection mode | Split method |
| Split ratio | 20 |
| Purge flow rate | 3 ml/minute |
| Sample vaporization chamber temperature | 130° C. |
| Ion source temperature | 230° C. |
| Measuring mode | SIM mode |
| Quantitative determination method | Absolute calibration curve method |

INDUSTRIAL APPLICABILITY

A trace amount of organic chlorosilanes contained as impurities in silicon tetrachloride is reduced at a low cost, whereby polycrystalline silicon having a small content of carbon, which can be used as a raw material of monocrystalline silicon for semiconductors, is obtained at a low cost.

REFERENCE SIGNS LIST

1: Silicon tetrachloride dropping device
2: Needle valve
3: Dropping counter

4: 3 L four neck flask
5: Oil bath
6: Thermometer (thermocouple)
7: Catalyst layer
8: Ribbon heater
9: Thermometer (thermocouple)
10: Brine cooling tube
11: Widmer
12: 500 mL eggplant flask
13: Seal pot
14: Packed tower
15: Heat insulating material
A: Dehumidified air
B: Nitrogen

The invention claimed is:

1. A method for purification of silicon tetrachloride comprising the steps of:
   (1) bringing a mixed gas comprising a silicon tetrachloride gas and an oxygen-containing gas into contact with a catalyst layer which is controlled to a temperature of 200 to 450° C. and which comprises at least one selected from the group consisting of activated carbon and metal-supporting activated carbon, and
   (2) cooling the mixed gas after brought into contact to separate and recover liquid silicon tetrachloride.

2. The method for purification of silicon tetrachloride as described in claim 1, further comprising a step of (3) distilling the liquid silicon tetrachloride.

3. The method for purification of silicon tetrachloride as described in claim 1, wherein the metal is at least one selected from the group consisting of platinum, palladium and rhodium.

4. The method for purification of silicon tetrachloride as described in claim 1, wherein the molar ratio of oxygen/silicon tetrachloride gas in the mixed gas is in the range of 0.0004 to 0.2.

5. The method for purification of silicon tetrachloride as described in claim 1, wherein the oxygen-containing gas is air or pure oxygen.

* * * * *

UNITED STATES PATENT AND TRADEMARK OFFICE
CERTIFICATE OF CORRECTION

| | | |
|---|---|---|
| PATENT NO. | : 8,273,316 B2 | Page 1 of 1 |
| APPLICATION NO. | : 13/059961 | |
| DATED | : September 25, 2012 | |
| INVENTOR(S) | : Satoshi Hayashida et al. | |

It is certified that error appears in the above-identified patent and that said Letters Patent is hereby corrected as shown below:

On the Title page of the patent grant, please replace item (86) filing date 371 (c)(1), (2), (4) "January 18, 2011" to --February 18, 2011--

Signed and Sealed this
Twenty-second Day of January, 2013

David J. Kappos
*Director of the United States Patent and Trademark Office*